US011951498B2

(12) United States Patent
Dufault

(10) Patent No.: US 11,951,498 B2
(45) Date of Patent: Apr. 9, 2024

(54) METHOD FOR DETECTION OF FLUID FLOW

(71) Applicant: Graco Minnesota Inc., Minneapolis, MN (US)

(72) Inventor: Peter N Dufault, Arden Hills, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 776 days.

(21) Appl. No.: 17/029,837

(22) Filed: Sep. 23, 2020

(65) Prior Publication Data

US 2021/0101165 A1 Apr. 8, 2021

Related U.S. Application Data

(60) Provisional application No. 62/910,917, filed on Oct. 4, 2019.

(51) Int. Cl.
*B05B 12/08* (2006.01)
*B05B 12/00* (2018.01)

(52) U.S. Cl.
CPC .......... *B05B 12/087* (2013.01); *B05B 12/006* (2013.01)

(58) Field of Classification Search
CPC ................ B05B 12/006; B05B 12/008; B05B 12/085–088; G01L 19/0007; G01L 19/0061
See application file for complete search history.

(56) References Cited

U.S. PATENT DOCUMENTS 4,988,015 A * 1/1991 Price .................. B05B 13/0431 222/1
6,053,147 A * 4/2000 Hemmerlein .......... F02M 65/00 123/198 D (Continued)

FOREIGN PATENT DOCUMENTS

CN 108721741 A 11/2018
CN 109990946 A 7/2019

(Continued)

OTHER PUBLICATIONS

Extended European Search Report for EP Application No. 20199426.6, dated Feb. 19, 2021, pp. 10.

(Continued)

*Primary Examiner* — Cody J Lieuwen
(74) *Attorney, Agent, or Firm* — Kinney & Lange, P. A.

(57) ABSTRACT

A spray gun system includes a spray gun, a pressure sensor, and a controller. The spray gun is configured to distribute a mixture of air and fluid onto a working surface. The pressure sensor is fluidly connected to the spray gun and is configured to measure fluid pressure within the spray gun system. The controller is electrically connected to the pressure sensor and is configured to calculate pressure error based on the measured pressure and a pressure set-point. The controller is further configured to increment a counter if the pressure error exceeds an error threshold, perform a flow control to adjust the pressure set-point to achieve a target flow rate in response to determining that the increment counter exceeds a count threshold, and perform a pressure control loop to adjust the fluid pressure within the spray gun system to achieve the pressure set-point.

12 Claims, 4 Drawing Sheets

(56) References Cited

U.S. PATENT DOCUMENTS

| | | | | |
|---|---|---|---|---|
| 6,149,071 | A * | 11/2000 | MacCallumMhor | B05B 12/085 239/69 |
| 2011/0006133 | A1 | 1/2011 | Lemmer et al. | |
| 2014/0131473 | A1 * | 5/2014 | Yan | B05B 12/085 239/71 |
| 2017/0043359 | A1 * | 2/2017 | Dufault | E03C 1/0408 |
| 2017/0209880 | A1 * | 7/2017 | Carideo | F04B 35/04 |
| 2019/0022678 | A1 | 1/2019 | Donaldson | |
| 2019/0388923 | A1 * | 12/2019 | Giacalone | B05B 12/00 |

FOREIGN PATENT DOCUMENTS

| | | | |
|---|---|---|---|
| EP | 3137229 | A1 | 3/2017 |
| ES | 2112702 | A1 | 4/1998 |
| WO | 2018207604 | A1 | 11/2018 |

OTHER PUBLICATIONS

First Chinese Office Action for CN Application No. 202011042316.9, dated Dec. 30, 2021, pp. 23.

Second Chinese Office Action for CN Application No. 202011042316.9, dated Nov. 2, 2022, pp. 20.

* cited by examiner

METHOD FOR DETECTION OF FLUID FLOW

BACKGROUND

The present disclosure relates to a spray gun system, and more particularly, to a method for detecting fluid flow in a spray gun system.

Spray guns are used to spray liquids, such as paint, under pressure onto a working surface. Spray guns can be used for many different applications but in many applications the spray gun is either pressure controlled or flow controlled to achieve the desired flow rate output. In a pressure controlled system, the user controls the dispensing flow rate by adjusting the pressure of the pump system, nozzle size, and the gun trigger opening position. In addition, a controller connected to both an electronically-controlled proportional valve and an electronic fluid pressure sensor attempts to drive the system pressure to the target pressure using closed-loop feedback control.

In a flow controlled system, the user controls the dispensing flow rate by setting the target flow rate in the controller. The controller is connected to and receives data from an electronically-controlled proportional valve, an electronic fluid pressure sensor, and an electronic flow meter. The controller uses feedback control techniques to adjust parameters of the spray gun system in an attempt to achieve the user-defined target fluid flow rate. In some flow controlled applications, the system can become over-pressured if only air and no fluid is dispensing from the spray gun. If only air is flowing from the spray gun, the controller may attempt to increase pressure rapidly because the flow meter is not returning a measurement equal to the target flow rate. If this occurs, the system may quickly become over-pressured, resulting in too much flow rapidly exiting the spray gun and an unsatisfactory finish on the working surface.

SUMMARY

According to one aspect of the disclosure, a spray gun system includes a spray gun, a pressure sensor, and a controller. The spray gun is configured to distribute a mixture of air and fluid onto a working surface. The pressure sensor is fluidly connected to the spray gun and configured to measure the fluid pressure within the spray gun system. The controller is electrically connected to the pressure sensor and configured to: receive a measured pressure from the pressure sensor; calculate pressure error based on the measured pressure and a pressure set-point; compare the pressure error to an error threshold; increment a counter if the pressure error exceeds the error threshold; perform, in response to determining that the increment counter exceeds a count threshold, a flow control loop that adjusts the pressure set-point to achieve a target flow rate; and perform a pressure control loop to adjust the fluid pressure within the spray gun system to achieve the pressure set-point.

According to another aspect of the disclosure, a method for detecting fluid flow in a spray gun system includes receiving, by the controller, a pressure measurement from the pressure sensor that is fluidly connected to the spray gun and electrically connected to the controller. The method further includes calculating, by the controller, the pressure error based on the measured pressure and a pressure set-point, comparing, by the controller, the pressure error to an error threshold, and incrementing, by the controller, a counter if the pressure error exceeds the error threshold. The method further includes performing, by the controller, in response to determining that the increment counter exceeds a count threshold, a flow control loop that adjusts the pressure set-point to achieve a target flow rate, and performing, by the controller, a pressure control loop to adjust the fluid pressure within the spray gun system to achieve the pressure set-point.

DETAILED DESCRIPTION

Figure 1:
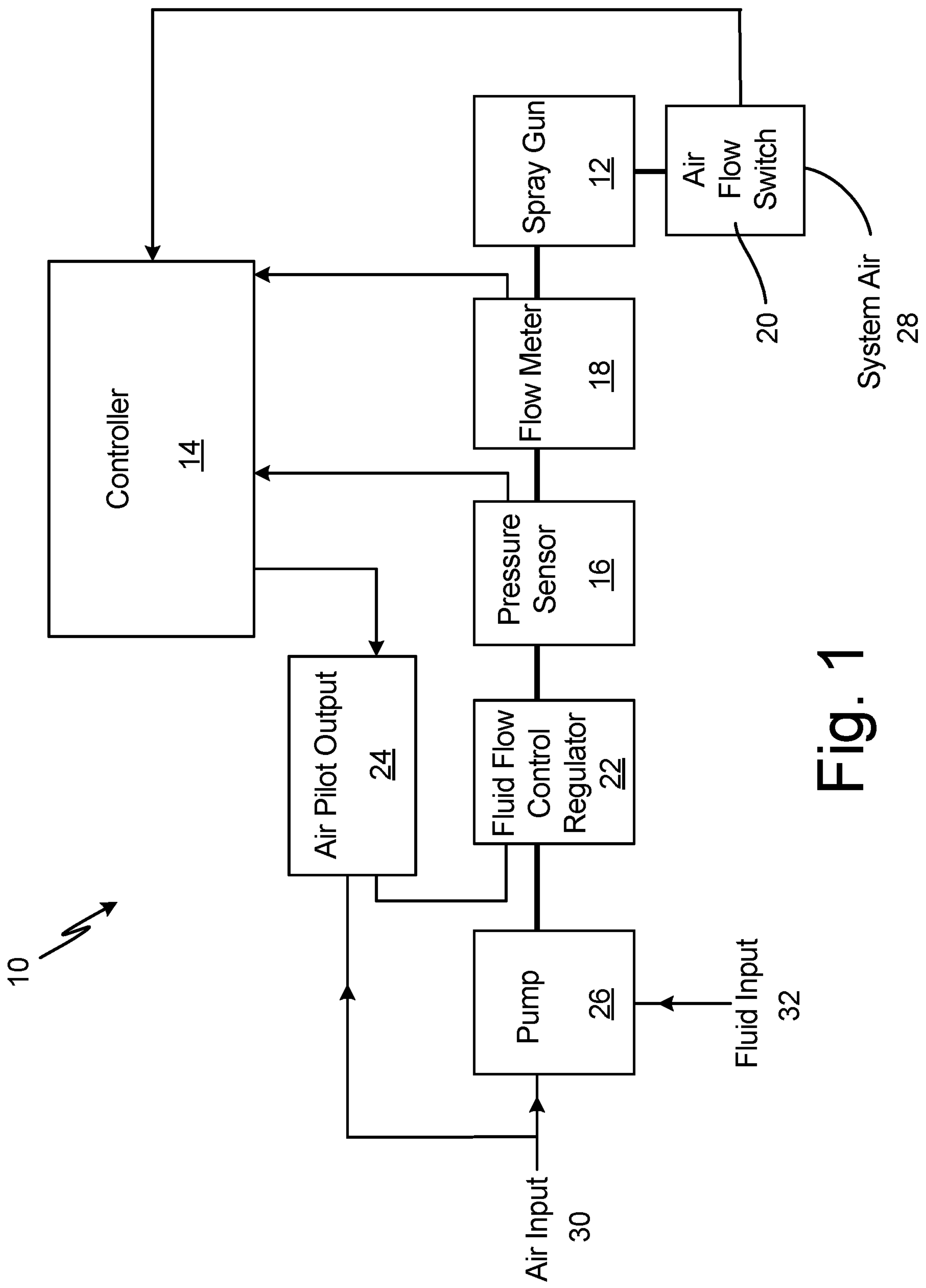
FIG. 1 is a schematic block diagram of a spray gun system.

FIG. 1 is a schematic block diagram of spray gun system 10 which includes spray gun 12, controller 14, pressure sensor 16, flow meter 18, airflow switch 20, fluid flow control regulator 22, air pilot output 24, and pump 26.

Spray gun 12 can be a manual, hand-held spray gun in which a user operates a trigger to discharge a liquid (e.g. paint) from a nozzle onto a working surface. Controller 14 can be a controller device configured to be communicatively coupled with components of spray gun system 10 for monitoring and control of the components during operation of the spray gun system 10, as is discussed further below. Pressure sensor 16 can be a device, such as a pressure transducer or other device, for measuring the pressure of gases or liquids that generates and sends a signal as a function of the pressure imposed on the device. Flow meter 18 can be a device capable of calculating the flow of a fluid by determining the forces produced by the flowing fluid as it overcomes a known constriction.

Airflow switch 20 can be a device that detects gas flow in a system and sends a signal indicating detection of the gas flow. Fluid flow control regulator 22 can be a device that regulates the flow or pressure (e.g. by adjusting the size of an orifice) of a fluid flowing through spray gun system 10. Air pilot output 24 can be a device that increases and/or decreases air pressure within spray gun system 10 to increase and/or decrease fluid pressure within fluid flow control regulator 22. Pump 26 can be a device that moves fluids using mechanical action. For example, pump 26 can be an electrically powered pump, a pneumatically powered pump, an engine powered pump, or any other type of pump capable of moving a fluid in spray gun system 10.

Though not shown in FIG. 1 for purposes of clarity and ease of illustration, controller 14 includes one or more processors and computer-readable memory. Examples of the one or more processors can include any one or more of a microprocessor, a digital signal processor (DSP), an application specific integrated circuit (ASIC), a field-programmable gate array (FPGA), or other equivalent discrete or integrated logic circuitry.

Computer-readable memory of controller 14 can be configured to store information within controller 14 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 14 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories.

Controller 14 can be a controller device configured to be communicatively coupled with components of spray gun system 10, such as pressure sensor 16, flow meter 18, airflow switch 20, and air pilot output 24, for monitoring and control of the components during operation of the spray gun system 10. In some examples, controller 14 includes and/or is operatively coupled to a display device and/or user interface elements (e.g., buttons, dials, graphical control elements presented at a touch-sensitive display, or other user interface elements) to enable user interaction with controller 14, such as for initialization, monitoring, and/or control of the system. Though not illustrated in the example of FIG. 1, in certain examples, controller 14 can be communicatively coupled to one or more remote computing devices, such as via a wired or wireless communications network, or both.

Spray gun 12 is pneumatically connected to and receives a gas flow, such as air, through airflow switch 20. Airflow switch 20 receives system air 28 through a hose or tube connected to airflow switch 20. Airflow switch 20 is also electrically connected to controller 14. Airflow switch 20 is configured to send airflow data to controller 14, indicating when air has begun to flow within spray gun system 10.

Spray gun 12 is also fluidly connected to and receives fluid flow through flow meter 18. Flow meter 18 is fluidly connected to both spray gun 12 and pressure sensor 16 and receives fluid flow through pressure sensor 16. Flow meter 18 is also electrically connected to controller 14 and flow meter 18 is configured to send fluid flow rate measurements to controller 14. In the embodiment shown, flow meter 18 is positioned between spray gun 12 and pressure sensor 16. In another embodiment, flow meter 18 can be positioned upstream of pressure sensor 16 or fluid flow control regulator 22. For example, flow meter 18 could be positioned between pressure sensor 16 and fluid flow control regulator 22. In another example, flow meter 18 could be positioned between fluid flow control regulator 22 and pump 26.

Pressure sensor 16 is fluidly connected to both flow meter 18 and fluid flow control regulator 22. Pressure sensor 16 receives fluid flow through fluid flow control regulator 22. Pressure sensor 16 is also electrically connected to controller 14 and pressure sensor 16 is configured to send fluid pressure measurements to controller 14. Fluid flow control regulator 22 is fluidly connected to both pressure sensor 16 and pump 26. Fluid flow control regulator 22 receives fluid flow through pump 26. Fluid flow control regulator 22 is also pneumatically connected to air pilot output 24 and fluid flow control regulator 22 receives pressurized input air from air pilot output 24. Air pilot output 24 is pneumatically connected to both fluid flow control regulator 22 and air input 30. Air pilot output 24 receives pressurized air from air input 30 and supplies the pressurized air to fluid flow control regulator 22.

Air pilot output 24 is also electrically connected to controller 14 and controlled by signals received from controller 14, such as a current, voltage, or other control signal configured to cause air pilot output 24 to increase and/or decrease air pressure provided to fluid flow control regulator 22 via air pilot output 24. Pump 26 is fluidly connected to fluid flow control regulator 22. Pump 26 receives working fluid (e.g., paint) from fluid input 32. Pump 26 is also pneumatically connected to air input 30 which supplies a gas, such as air, to power pump 26.

In operation, working fluid enters pump 26 through fluid input 32 and air enters pump 26 through air input 30. The air entering pump 26 is used to power pump 26 and allows pump 26 to drive fluid through spray gun system 10 under pressure. Pressurized air from air input 30 is also directed to air pilot output 24. Air pilot output 24 uses the pressurized air to control the fluid pressure within fluid flow control regulator 22 based on a command received from controller 14 to adjust pressure within spray gun system 10, such as a current, a voltage, or other control signal.

Fluid flow control regulator 22 receives fluid from pump 26 and is configured to control the fluid pressure within spray gun system 10 by, e.g., adjusting the size of an orifice within fluid flow control regulator 22 or otherwise increasing and/or decreasing pressure of the fluid according to the control signal received from air pilot output 24. The pressurized fluid exiting fluid flow control regulator 22 is driven through spray gun system 10. Pressurized fluid driven through fluid flow control regulator 22 is received by pressure sensor 16, which is configured to measure the fluid pressure within spray gun system 10 and transmit the fluid pressure measurement to controller 14 for further processing, as is discussed further below.

In the embodiment shown, flow meter 18 receives fluid from pressure sensor 16 and is configured to measure the fluid flow rate of spray gun system 10 and transmit the flow rate measurement to controller 14 for further processing, as is discussed further below. The pressurized fluid reaches spray gun 12 where it is mixed with a flow of air in response to operator action to activate spray gun 12, such as via a trigger or other actuation mechanism of spray gun 12. The flow of air passes airflow switch 20, causing airflow switch 20 to send a signal to controller 14 indicating that air is flowing within spray gun system 10. The mixture of pressurized fluid and pressurized air atomizes the fluid mixture, resulting in a satisfactory finish on the working product.

According to techniques of this disclosure, controller 14 implements closed-loop control operations to control fluid pressure within spray gun system 10 to achieve a target flow rate of fluid distributed from spray gun 12, such as a user-defined target flow rate (e.g., entered via a user interface of controller 14), a system-defined target flow rate, a predefined target flow rate, or other target flow rate. For instance, as is further described below, controller 14 can implement a flow control loop that adjusts a pressure set-point to achieve the target flow rate. The flow control loop can be implemented as a proportional-integral-derivative (PID) control loop or other closed-loop control algorithm. For example, controller 14 can receive, as feedback, a measured flow rate of fluid within spray gun system 10 from flow meter 18, the measured flow rate indicating a rate of fluid flowing through spray gun system 10 from pump 26 to spray gun 12. Controller 14 can increase and/or decrease the pressure set-point in a controlled manner (i.e., via the flow control feedback loop) to achieve the target flow rate.

Controller 14 can further implement a pressure control loop (e.g., a PID control loop or other closed-loop control algorithm) to adjust fluid pressure within spray gun system 10 to achieve the pressure set-point defined by the flow control loop. For instance, controller 14 can receive, as feedback, a measured pressure of fluid within spray gun system 10 via pressure sensor 16. Controller 14 can output, via the pressure control loop, a control command (e.g., a voltage, a current, or other control command) to air pilot output 24 to cause air pilot output 24 to increase and/or decrease the fluid pressure via fluid flow control regulator 22.

As such, controller 14 can control a pressure set-point via a flow control loop (e.g., an outer loop) to achieve a target flow rate, such as a user-defined target flow rate configured to produce a satisfactory finish of the fluid (e.g., paint) on a working product. Controller 14 can further control fluid pressure within spray gun system 10 via a pressure control loop (e.g., an inner loop) to achieve the pressure set-point determined via the flow control loop.

In some examples, spray gun 12 can be manually actuated (e.g., via a trigger or other actuation mechanism) such that only pressurized air flows through spray gun 12. That is, in certain examples, spray gun 12 can be manually actuated via user input to a trigger or other mechanism so that pressurized air is distributed from spray gun 12 and fluid (e.g., paint) is not distributed from spray gun 12, such as for the often-termed "dusting" of the surface of the working product. In such examples, air flowing through spray gun 12 is sensed by airflow switch 20, which transmits a signal (e.g., an electrical signal) to controller 14 indicating that air is being distributed by spray gun 12. Since fluid is not being distributed by spray gun 12 in such examples, fluid pressure within spray gun system 10 is maintained at the pressure set-point via the pressure control loop implemented by controller 14. However, in examples where fluid is not being distributed, the error term in the flow control loop representing a difference between the target flow rate and the measured flow rate can be large, thereby resulting in an increased pressure set-point and a buildup of fluid pressure within spray gun system 10 via operation of the pressure control loop to achieve the increased pressure set-point.

As such, according to techniques described herein, controller 14 executes the flow control loop to achieve the target flow rate in response to determining that fluid is being distributed from spray gun 12. Controller 14 refrains from executing the flow control loop to achieve the target flow rate in response to determining that fluid is not being distributed from spray gun 12, but rather executes only the pressure control loop to maintain the pressure set-point. As such, controller 14 can maintain the pressure set-point when fluid is not being distributed without resulting in a buildup of system pressure and the undesirable spraying effects resulting therefrom.

Moreover, controller 14 can determine whether fluid is being distributed from spray gun 12 based on an error term within the pressure control loop representing a difference between the pressure set-point and the measured pressure received from pressure sensor 16. That is, rather than utilize the flow rate measurement from flow meter 18, which can introduce latency into the flow detection operations, controller 14 can determine whether fluid is flowing within spray gun system 10 using the pressure error term within the pressure control loop. Such flow detection operations can identify, based on the tendency of pressure to decrease within moving fluid, the movement of fluid within spray gun system 10 prior to detection by flow meter 18. As such, controller 14, monitoring the pressure error term within the pressure control loop, can quickly and reliably identify the movement of fluid within spray gun system 10, thereby enabling controller 14 to quickly and efficiently respond to moving fluid to execute the flow control loop and provide satisfactory finish to the working product.

Figure 2A:
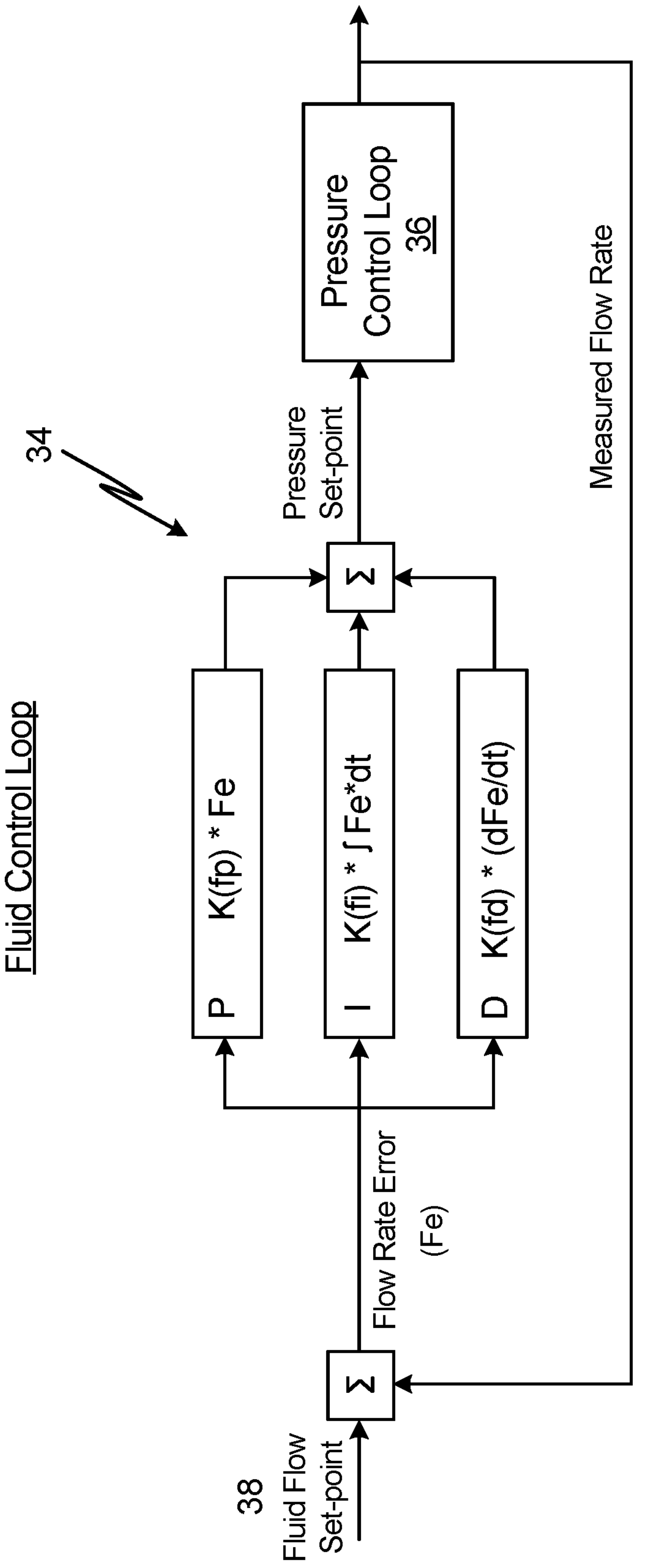
FIG. 2A is a schematic block diagram of an example fluid control loop within the spray gun system.
Figure 2B:
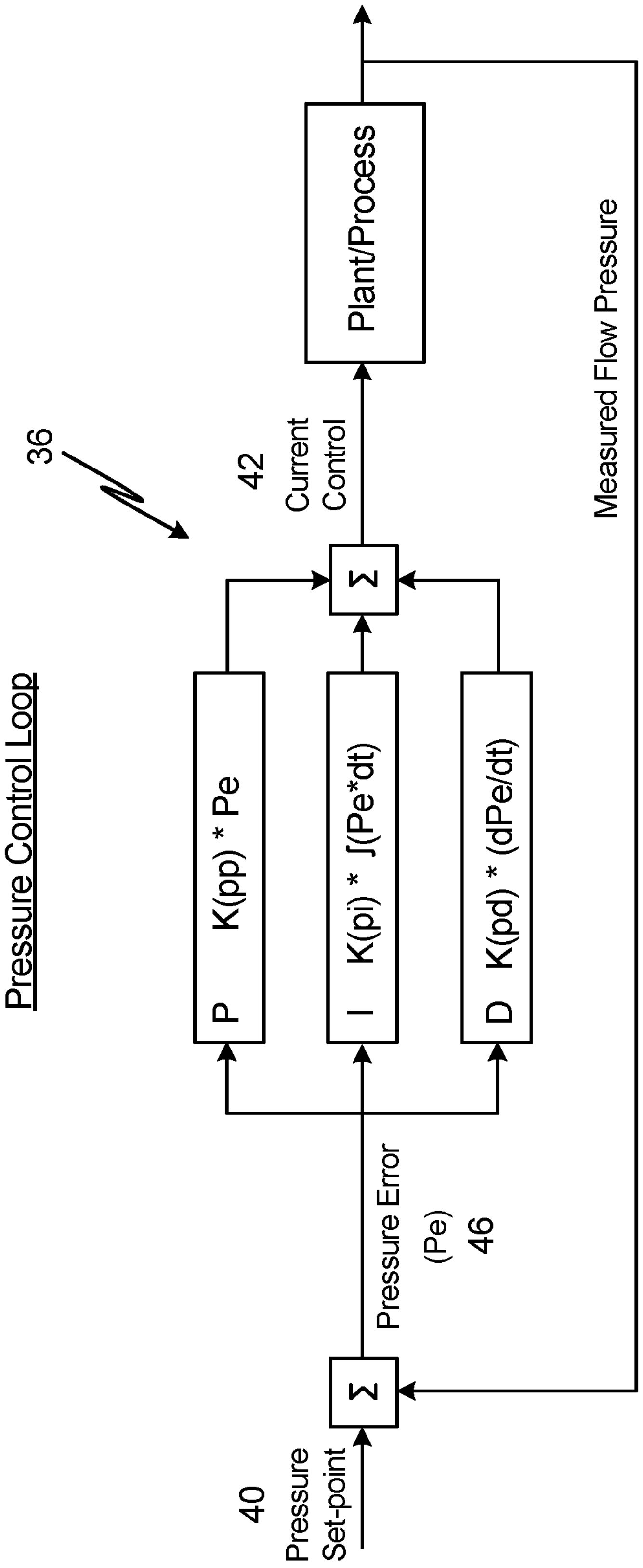
FIG. 2B is a schematic block diagram of an example pressure control loop within the spray gun system.

FIG. 2A is a schematic block diagram of fluid control loop 34, which is executed by controller 14 of spray gun system 10. FIG. 2B is a schematic block diagram of pressure control loop 36, which is executed by controller 14 of spray gun system 10. FIGS. 2A and 2B will be discussed together. FIGS. 2A and 2B both include a proportional-integral-derivative (PID) control loop, with FIG. 2A showing a fluid flow PID control loop and FIG. 2B showing a pressure PID control loop. PID control loops continuously calculate an error value, which is the difference between a desired set-point and a measured process variable, and then apply a correction based on proportional, integral, and derivative terms of the error. PID control loops can be used to automatically apply accurate and responsive correction to a control function with minimal delay and overshoot, resulting in convergence on the desired set-point quickly and efficiently.

When operating spray gun system 10 in a flow control operation, controller 14 can identify a fluid flow set-point (i.e., a target flow rate) received via user input or defined by controller 14 (e.g., predefined and stored in computer-readable memory of controller 14). As shown in FIG. 2A, fluid flow set-point 38 is provided as input to fluid control loop 34 and is processed by the PID function within fluid control loop 34. For example, as illustrated in FIG. 2A, fluid control loop 34 can subtract the measured flow rate received from flow meter 18 from fluid flow set-point 38 to identify a flow rate error (Fe).

Fluid control loop 34 further identifies a mathematical integral of the flow rate error with respect to time (e.g., via numerical integration techniques) and a mathematical derivative of the flow rate error with respect to time (e.g., via numerical differentiation techniques). Fluid control loop 34 multiplies the flow rate error by a proportional gain to produce a scaled proportional error term. Fluid control loop 34 multiplies the integral of the flow rate error by an integral gain to produce a scaled integrated error term. Fluid control loop 34 multiplies the derivative of the flow rate error by a derivative gain to produce a scaled differentiated error term. Fluid control loop 34 determines pressure set-point 40 as the sum of the scaled proportional error term, the scaled integrated error term, and the scaled differentiated error term. Values of the proportional gain, the integral gain, and the derivative gain can be determined experimentally and/or mathematically to achieve target response time and accuracy thresholds.

Fluid control loop 34 outputs pressure set-point 40 for processing by the pressure control loop, as is further described below. Accordingly, fluid control loop 34 identifies a pressure set-point that can be utilized for achieving a fluid flow set-point that is determined and/or received via user input to produce a satisfactory finish on a working surface.

As shown in FIG. 2B, pressure set-point 40 is provided as input to pressure control loop 36 and is processed by the PID function in pressure control loop 36. For instance, as was similarly described above with respect to fluid control loop 34 of FIG. 2A, pressure control loop 36 can implement a PID feedback control loop based on a pressure error representing a difference between pressure set-point 40 and a measured fluid pressure received from pressure sensor 16. Pressure control loop 36 can determine the pressure error (Pe) by subtracting the measured pressure received from pressure sensor 16 from pressure set-point 40. Pressure control loop 36 can multiply the pressure error by a proportional gain to produce a scaled proportional error term. Pressure control loop 36 further multiplies the integral of the pressure error by an integral gain to produce a scaled integrated error term, and multiplies the derivative of the pressure error by a derivative gain to produce a scaled differentiated error term. Pressure control loop 36 determines current control value 42 as the sum of the scaled proportional error term, the scaled integrated error term, and the scaled differentiated error term. Values of the proportional gain, the integral gain, and the derivative gain can be determined experimentally and/or mathematically to achieve target response time and accuracy thresholds.

As illustrated in FIG. 2B, pressure control loop 36 outputs current control value 42 that is utilized for transmitting a control command (e.g., a current control command) to air pilot output 24. For instance, current control value 42 can represent a current value, such as current value between four and twenty milliamps (or other ranges), which is configured to represent a scale of pressure ranges output by air pilot output 24. Though the example of FIG. 2B illustrates and describes current control value 42 as representing an electrical current, it should be understood that other control values can be utilized, such as a voltage control, a digital output, or other control values configured to control operation of air pilot output 24 to supply pressure air.

Air pilot output 24 supplies pressurized air to fluid flow control regulator 22 to increase or decrease fluid pressure within spray gun system 10 based on current control value 42 provided by controller 14. Increasing or decreasing the fluid pressure within spray gun system 10 results in an increase or decrease in the fluid flow rate exiting spray gun 12. Pressure sensor 16, flow meter 18, and controller 14 (with fluid control loop 34 and pressure control loop 36) work in conjunction to continuously monitor the pressure and fluid flow rate within spray gun system 10 and also to adjust the fluid pressure within spray gun system 10 to achieve fluid flow set-point 38 (e.g., input by the user into controller 14). Further, data within pressure control loop 36 can be utilized to indicate precisely when fluid begins to flow within spray gun system 10, as is discussed further below.

Figure 3:
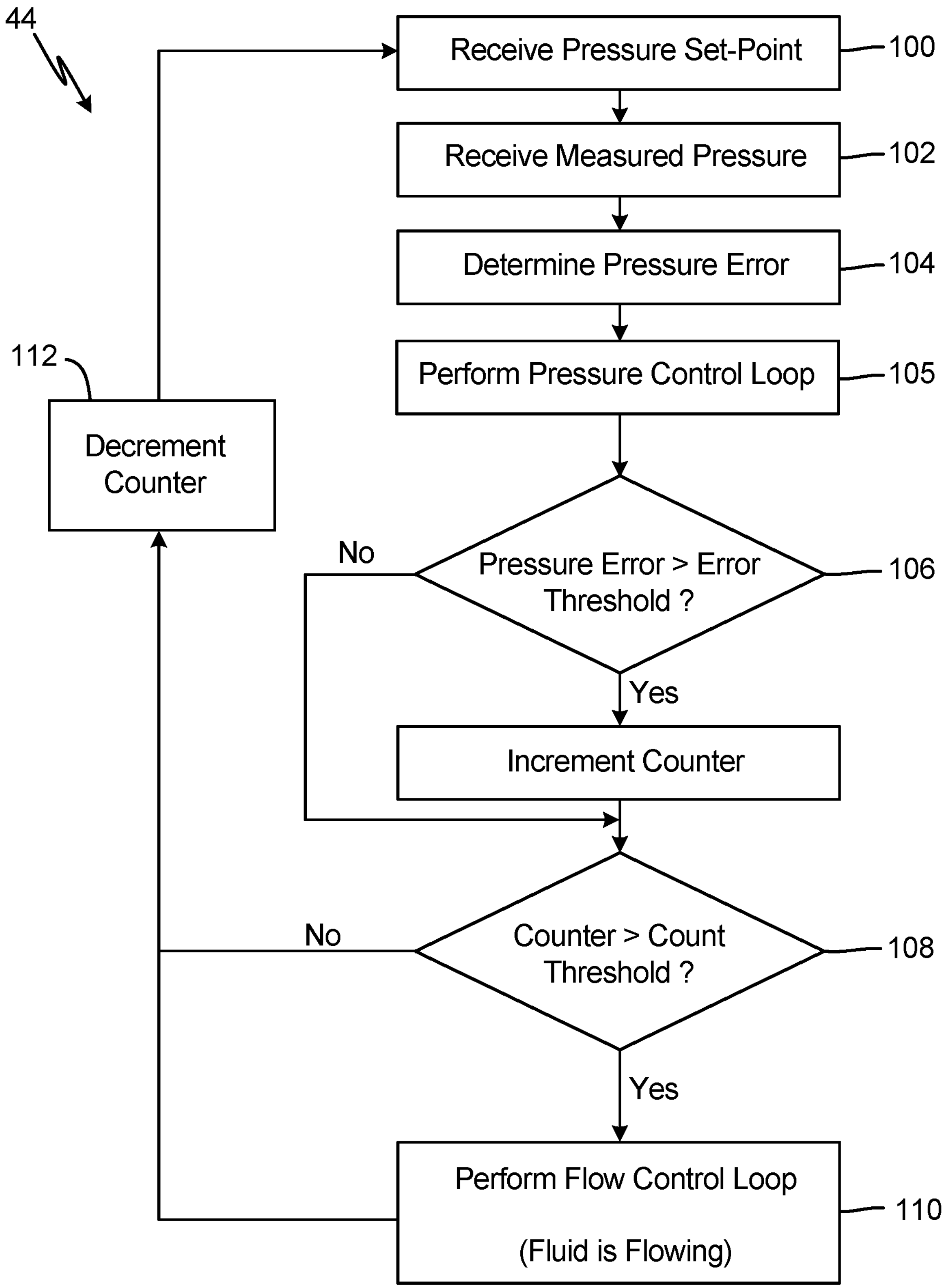
FIG. 3 is a flowchart illustrating example operations of the fluid flow detection process within the spray gun system.

FIG. 3 is a flowchart illustrating example operations of fluid flow detection process 44 within spray gun system 10. Fluid flow detection process 44 includes steps 100-112. Step 100 includes receiving pressure set-point 40 from fluid control loop 34. Step 102 includes receiving the measured fluid pressure within spray gun system 10 from pressure sensor 16. Step 104 includes calculating pressure error 46 within spray gun system 10. For instance, controller 14 can subtract the measured pressure received by pressure sensor 16 from pressure set-point 40 to determine pressure error 46. Step 105 includes performing pressure control loop 36, as discussed above in FIG. 2B. For instance, controller 14 can execute pressure control loop 36 to adjust current control value 42 to achieve pressure set-point 40.

Step 106 includes comparing the calculated pressure error 46 to an error threshold. The error threshold can be a user defined value, an experimental based value, or a mathematically derived value. If pressure error 46 is greater than the error threshold ("YES" branch of Step 106), a counter is incremented. For instance, controller 14 can increment the counter by an increment value, such as an integer value of two, or other integer or non-integer values. If pressure error 46 is not greater than the error threshold ("NO" branch of Step 106), the counter is not incremented.

Step 108 includes comparing the counter to a count threshold. The count threshold can be a user defined value, an experimental based value, or a mathematically derived value. If the counter is greater than the count threshold ("YES" branch of Step 108), this indicates that fluid is flowing within spray gun system 10. In response to determining that the counter is greater than the count threshold, Step 110 includes controller 14 executing fluid control loop 34 to adjust pressure set-point 40 to achieve fluid flow set-point 38. If the counter is not greater than the count threshold ("NO" branch of Step 108), this indicates that fluid is not flowing within spray gun system 10. In response to determining that the counter is not greater than the count threshold, controller 14 refrains from executing fluid control loop 34 and continues to execute pressure control loop 36 to achieve a predefined pressure set-point.

Step 112 includes decrementing the counter each time pressure error 46 is compared to the error threshold. For example, controller 14 can decrement the counter by a decrement value, such as an integer value of one, or other integer or non-integer value. In some examples, the increment value (i.e., applied in Step 106) can be greater than the decrement value, such that the counter is incremented at a greater rate than it is decremented, but is incremented only in response to determining that pressure error 46 is greater than the error threshold. Further, controller 14 of spray gun system 10 is configured to set the counter to an initialization value in response to receiving a signal from airflow switch 20 indicating that spray gun 12 is not triggered and airflow is not being distributed from spray gun system 10. In other words, controller 14 can receive an indication that air is not flowing from airflow switch 20 and in response reset the counter to an initialization value, such as a value or 1.

Fluid flow detection process 44 prevents over-pressurization of spray gun system 10 when the system is in a flow control operation. Fluid flow detection process 44 responds very quickly and directly to fluid flow within spray gun system 10, even for very low fluid flow rates. Further, fluid flow detection process 44 can replace or eliminate the need for airflow switch 20 because fluid flow detection process 44 indicates precisely when fluid is flowing through spray gun system 10. Knowing when fluid is flowing helps prevent over-pressurization of spray gun system 10 which results in a stable and even flow exiting spray gun 12, leading to satisfactory finishes on working surfaces when in flow control operation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray gun system comprising:
- a spray gun configured to distribute a mixture of air and fluid onto a working surface;
- a pressure sensor fluidly connected to the spray gun, wherein the pressure sensor is configured to measure fluid pressure within the spray gun system; and
- a controller electrically connected to the pressure sensor, wherein the controller is configured to:
  - receive a measured pressure from the pressure sensor;
  - calculate pressure error based on the measured pressure and a pressure set-point;
  - compare the pressure error to an error threshold;

increment an increment counter if the pressure error exceeds the error threshold;

determining that fluid is flowing through the spray gun based on the increment counter exceeding a count threshold;

perform, in response to determining that fluid is flowing through the spray gun based on the increment counter exceeding the count threshold, a flow control loop that adjusts the pressure set-point to achieve a target flow rate; and perform a pressure control loop to adjust the fluid pressure within the spray gun system to achieve the pressure set-point.

2. The spray gun system of claim 1, wherein the controller is further configured to refrain from performing the flow control loop in response to determining that the increment counter does not exceed the count threshold.

3. The spray gun system of claim 1, wherein the controller calculates the pressure error by subtracting the measured pressure from the pressure set-point.

4. The spray gun system of claim 3, wherein:

the pressure set-point is one of a user defined value, an experimentally-defined value, or a mathematically-derived value based on the target flow rate determined during operation of the flow control loop; and the error threshold is one of a user defined value, an experimentally-defined value, or a mathematically-derived value.

5. The spray gun system of claim 1, wherein the controller is further configured to decrement the counter after a comparison of the pressure error and the error threshold, and based on the pressure error being less than the error threshold.

6. The spray gun system of claim 1 and further comprising an airflow switch pneumatically connected to the spray gun and electrically connected to the controller, wherein the airflow switch is configured to send a signal to the controller indicating whether the spray gun is triggered and airflow is being distributed from the spray gun or whether the spray gun is not triggered and airflow is not being distributed from the spray gun.

7. The spray gun system of claim 6, wherein the controller is further configured to set the counter to an initialization value in response to receiving a signal from the airflow switch indicating that the spray gun is not triggered and airflow is not being distributed from the spray gun system.

8. The spray gun system of claim 1 and further comprising:

a flow meter fluidly connected to the spray gun and electrically connected to the controller;

wherein the flow meter is configured to measure fluid flow rate of the spray gun system; and wherein the flow meter is configured to send the fluid flow rate measurement to the controller.

9. The spray gun system of claim 8, wherein the controller is configured to perform the flow control loop to achieve the target flow rate based on a difference between the target flow rate and the fluid flow rate measurement.

10. The spray gun system of claim 1 and further comprising a fluid flow control regulator fluidly connected to the pressure sensor, wherein the fluid flow control regulator is configured to control the fluid pressure within the spray gun system.

11. The spray gun system of claim 10 and further comprising an air pilot output pneumatically connected to the fluid flow control regulator and electrically connected to the controller, wherein the controller is configured to send a signal to the air pilot output to adjust the fluid pressure within the fluid flow control regulator to achieve the pressure set-point.

12. The spray gun system of claim 10 and further comprising a pump fluidly connected to the fluid flow control regulator, wherein the pump is configured to supply fluid to the spray gun system.

* * * * *